United States Patent [19]

Kuzmenko et al.

[11] Patent Number: 5,311,485
[45] Date of Patent: May 10, 1994

[54] FIBER OPTIC HYDROPHONE

[75] Inventors: Paul J. Kuzmenko; Donald T. Davis, both of Livermore, Calif.

[73] Assignee: The United States of America as represented by the United States Department of Energy, Washington, D.C.

[21] Appl. No.: 968,950

[22] Filed: Oct. 30, 1992

[51] Int. Cl.⁵ .......................................... H04R 23/00
[52] U.S. Cl. ................................................. 367/149
[58] Field of Search .............. 367/140, 149, 166, 167, 367/171, 172, 176; 250/227.27, 227.19; 385/12, 13

[56]  References Cited
U.S. PATENT DOCUMENTS

| | | | |
|---|---|---|---|
| 4,193,130 | 3/1980 | Young et al. | 367/149 |
| 4,400,805 | 8/1983 | Nadler | 367/140 |
| 4,519,252 | 5/1985 | McMahon | 73/655 |
| 4,649,528 | 3/1987 | Benjamin | 367/149 |
| 4,866,681 | 9/1989 | Fertig | 367/140 |
| 4,951,271 | 8/1990 | Garret et al. | 367/141 |

OTHER PUBLICATIONS

P. J. Kuzmenko, "Experimental Performance of a Miniature Fabry–Perot Fiber Optic Hydrophone", 8th Optical Fiber Sensors Conference, Jan. 29–31, 1992, Monterey, Calif., pp. 354–357, IEEE Cat. #92CH3107–O.

Primary Examiner—Daniel T. Pihulic
Attorney, Agent, or Firm—Henry P. Sartorio; Roger S. Gaither; William R. Moser

[57]  ABSTRACT

A miniature fiber optic hydrophone based on the principles of a Fabry-Perot interferometer. The hydrophone, in one embodiment, includes a body having a shaped flexible bladder at one end which defines a volume containing air or suitable gas, and including a membrane disposed adjacent a vent. An optic fiber extends into the body with one end terminating in spaced relation to the membrane. Acoustic waves in the water that impinge on the bladder cause the pressure of the volume therein to vary causing the membrane to deflect and modulate the reflectivity of the Fabry-Perot cavity formed by the membrane surface and the cleaved end of the optical fiber disposed adjacent to the membrane. When the light is transmitted down the optical fiber, the reflected signal is amplitude modulated by the incident acoustic wave. Another embodiment utilizes a fluid filled volume within which the fiber optic extends.

22 Claims, 1 Drawing Sheet

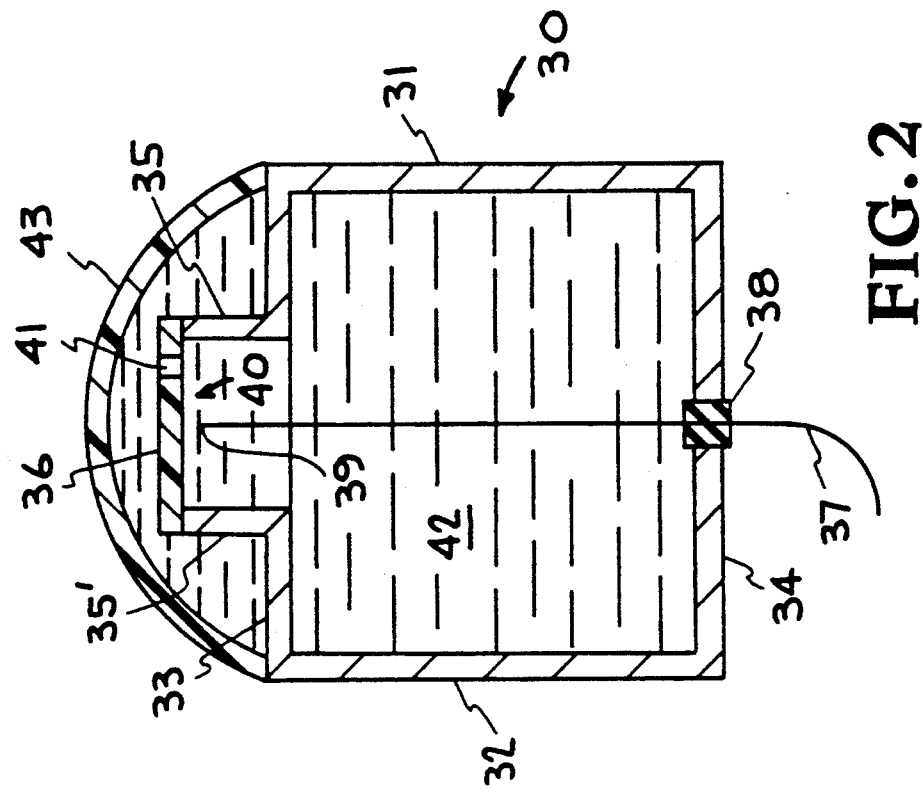
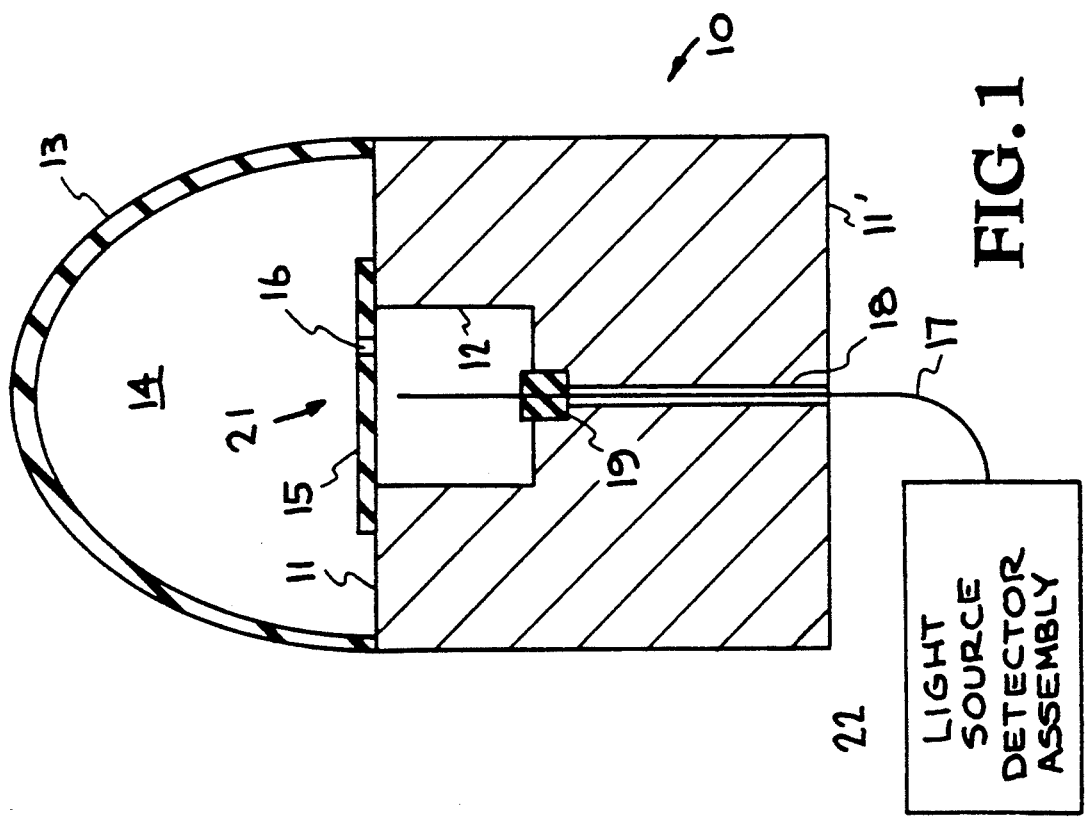

FIBER OPTIC HYDROPHONE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to hydrophones, particularly to an optical fiber hydrophone, and more particularly to a miniature Fabry-Perot fiber optic hydrophone.

It is well known that when an acoustic wave propagates in a medium, the periodic variations in pressure cause corresponding periodic variations in the optical index of the medium. Thus, if a light beam is directed through a straight optic fiber and the optic fiber is subjected to an acoustic wave, the index of refraction of the optic fiber will be changed. As the index of refraction of the optic fiber changes, the phase of the light beam traversing the optic fiber will change. Thus, as the acoustic waves change the index of refraction of the optic fiber, the light passing through the optic fiber changes its phase. This phase change is proportional to the change in the index of refraction of the optic fiber, which is proportional to the pressure variation in the acoustic wave. Therefore, the phase change in the light is a measure of the acoustic pressure field incident on the optic fiber.

Hydrophones utilizing fiber optics have been developed wherein a light passing through an optical fiber is modulated by an acoustic-optic interaction. Such prior art hydrophones are exemplified by U.S. Pat. No. 4,193,130 issued Mar. 11, 1980 to A. M. Young et al.; No. 4,519,252 issued May 28, 1985 to D. H. McMahon; and No. 4,951,271 issued Aug. 21, 1990 to S. L. Garrett et al. In addition, the literature reports an acoustic sensor based on a Fabry-Perot interferometer, with such an interferometer on the end of an optic fiber using the fiber tip as one mirror and a sound receiving diaphragm as the second mirror. See M. Matsumoto et al., Tech. Digest OFS '86, p. 43–46, 1986; and R. Ohba et al., J. Phys. E: Sci. Instrum. 20, 1380-2, 1987.

It is thus seen that the advantages of fiber optic sensors in hydrophone applications are well known. They offer excellent sensitivity, resistance to electromagnetic interference, and all active electronics are kept out of the water. One aspect where they are not clearly superior to conventional piezoelectric transducers is their size. For some applications size is critical and existing designs are too large. Thus, there exist a need in the field of fiber optic hydrophones for a very small hydrophone to satisfy certain applications. This need is satisfied by the present invention in that it provides a very small fiber optic hydrophone based on a Fabry-Perot interferometer.

SUMMARY OF THE INVENTION

An object of the present invention is to provide a very small fiber optic hydrophone.

A further object of the invention is to provide a very small fiber optic hydrophone based on a Fabry-Perot interferometer.

Another object of the invention is to provide a miniature Fabry-Perot fiber optic hydrophone, using a Fabry-Perot cavity formed by a deflectable membrane and the cleaved end of a single mode optical fiber.

Another object of the invention is to provide a miniature fiber optic hydrophone utilizing a Fabry-Perot cavity formed by a flexible member and an end of a fiber optic wherein acoustic waves causes flexing of the member and modulating the reflectivity in the interferometry cavity such that light through the fiber optic is amplitude modulated.

Other objects and advantages of the present invention will become apparent from the following description and accompanying drawings.

Basically, the invention includes a body in which is formed a Fabry-Perot interferometer by a flexible membrane and the cleaved end of a single mode optical fiber. As the membrane is deflected by acoustic waves toward the end of the optical fiber having a light beam transmitted there through, modulating of the reflectivity of the interferometer results, and the reflected light signal is amplitude modulated by the incident acoustic wave. One embodiment of the invention uses an air or gas filled bladder about the flexible membrane and an incident acoustic wave on the bladder compresses the air or gas causing movement of the membrane, thus modulating the Fabry-Perot cavity. Another embodiment of the invention uses a housing containing a fluid on one side of the flexible membrane, wherein an incident acoustic wave on the membrane causes compression of the fluid, thus modulating the Fabry-Perot cavity.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 1 schematically illustrates an embodiment of the Fabry-Perot fiber optic hydrophone of the invention.

FIG. 2 is a partial cross-sectional view of another embodiment of the invention.

DETAILED DESCRIPTION OF THE INVENTION

The present invention relates to a very small fiber optic hydrophone based on a Fabry-Perot interferometer. The interferometer is formed within a body or housing between a flexible membrane and the inner or cleaved end of a single mode optical fiber. Flexing of the membrane caused by an acoustic wave in the surrounding water causes the spacing between the membrane and the optical fiber end to change thereby modulating the reflectivity of the interferometer, and thus when light is transmitted down the optical fiber, the reflected light signal is amplitude modulated by the incident acoustic wave.

In one embodiment of the invention, the flexible membrane is deflected via an air or gas filled bladder, with the acoustic waves impinging on the bladder, while in another embodiment the bladder and housing are filled with a liquid.

Referring now to the FIG. 1 embodiment, the miniature Fabry-Perot fiber optic hydrophone comprises a body or housing 10 having a end sections 11 and 11' with end section 11 including an inwardly protruding or countersink section 12 defining a cavity therein, with a flexible bladder 13 secured to the body end section 11 and defines a volume 14. Cavity 12 is closed by a thin flexible membrane 15 having a small vent hole 16 thereon. The volume 14 defined by bladder 13 and cavity 12 contain air or a suitable gas, and the bladder 13, air or gas volume 14, and vent hole 16 provide pressure compensation (equalizes static pressures) with changes in depth and serve to protect the membrane 15. A single mode optical fiber 17 extends through a passage or opening 18 in body 10 via end section 11′, through a sealed opening 19 (such as epoxy) in the end section defining cavity 12, and into cavity 12, such that the inner or cleaved end 20 of optical fiber 17 is located in a spaced relation to membrane 15 to define a Fabry-Perot interferometer generally indicated at 21. The efficiency of the Fabry-Perot interferometer may be enhanced by depositing reflective coatings on the tip of the fiber and on the membrane. The bladder 13 keeps water away from the interferometer 21 while freely transmitting pressure fluctuations from the water to the air or gas in volume 14. Pressure variations in the bladder 13 cause the membrane 15 to deflect, modulating the reflectivity of the interferometer. As depth increases, the bladder will slowly collapse on itself, keeping the internal and external pressures balanced. The other end of optical fiber 17 is connected to a light source/detector assembly 22, and the light source may be a laser, whereby, when light is transmitted down the optical fiber 17, a light signal is reflected by the interferometer 21, as well known in the art, based on the reflectivity of the interferometer. Thus, when an acoustic wave is incident on bladder 13 it causes a pressure variation in the air or gas of volume 14 which is transmitted to the membrane 15 causing the membrane to deflect, modulating the reflectivity of the interferometer 21, which results in the reflected light signal in optical fiber 17 to be amplitude modulated by the incident acoustic wave. The reflected light signal passed through optical fiber 17 to assembly 22 is processed to produce an output signal, etc. as known in the art.

By way of example, the bladder 13 may be constructed of rubber, such as latex rubber, or from other thin flexible material such plastic (e.g. poly-vinylidene chloride, or "Saran-Wrap" manufactured by The Dow Chemical Co., Indianapolis, Ind. Latex rubber has a moderate gas permeability causing the bladder to slowly deflate, and thus a plastic having a very low permeability would be better suited for long term operation. The volume 14 within bladder 13 may contain air or a large molecules gas ($SF_6$, $C_3H_8$, or some fluorocarbons), and the use of such gases would lower the permeation rate through the bladder.

In the miniature fiber optic hydrophone of FIG. 1, the body 10 may be constructed of low expansion ceramic or metal, such as fused silica, glass or Macor, a machinable ceramic manufactured by Corning Glass, wall thickness of 1–3 mm and with a length of 5–10 mm, with end sections 11 and 11′ having width of 3–10 mm; the cavity 12 having a width of 1–4 mm and depth of 3–5 mm; the membrane 15 being made of Parylene, Formvar, Mylar, or Kapton having a thickness of 0.1 $\mu$m to 1.0 $\mu$m, with the vent hole 16 having a cross-section or diameter of 10 $\mu$m to 50 $\mu$m; the bladder 13 made of latex rubber having a thickness of 50 $\mu$m to 500 $\mu$m; such that volume 14 is $\frac{1}{2}$ to 5 $cm^3$, and being filled with air. The diameter of vent hole 16 is determined by the desired low frequency cutoff. The sealed opening 19 may be sealed by epoxy or a conventional rubber or plastic pass-through which prevents leakage around the fiber optic 17.

The flexible bladder or balloon 13 can be modeled as spherical bubble and external acoustic waves in the water which are incident on the bubble and thus the air or gas volume therein induce internal pressure variations. Theory tells us that at low frequencies the internal and external pressures on the bubble have equal amplitudes, but at high frequencies there is a sharp resonance around which the internal pressures are amplified. Above the resonance the internal pressure variations decrease as $1/f^2$. For a 1 $cm^3$ bubble at a depth of 20 feet, the resonance occurs at about 670 Hz. Reducing the bubble size or increasing the depth increases the resonant frequency.

Although the bladder or balloon 13 transmits low frequencies well, the sensitivity rolls off due to the pressure equalizing vent 16 in the membrane 15. The roll-off frequency can be controlled by changing the diameter of the vent hole 16 or the volume of the cavity 12 behind the membrane 15. Since the compressibility of the air in this back cavity 12 provides the restoring force for the membrane (the membrane tension being very low), adjusting the volume in cavity 12 will alter the sensitivity of the hydrophone. One drawback of this situation is that the sensitivity of the hydrophone does vary with pressure. However, the overall sensitivity is very good and can be designed to meet desired values by controlling the back cavity 12 volume.

The miniature Fabry-Perot fiber optic hydrophone of this invention has been experimentally demonstrated using a bladder or balloon 13 with a volume 14 of about 1 $cm^3$, and the sensitivity thereof was −122dB re 1 Volt/$\mu$Pa, which compares very favorably with existing hydrophones, even though its volume is much smaller than that of prior known sensors. For details of the experimental testing of the FIG. 1 embodiment see an article by coinventor Paul J. Kuzmenko entitled, "Experimental Performance Of A Miniature Fabry-Perot Fiber Optic Hydrophone", Conference Proceedings, 8th Optical Fiber Sensors Conference, Jan. 29–31, 1992, p. 354–357, IEEE Catalog #92CH3107-0.

The compressibility of air and gas vary with pressure. Therefore, the sensitivity of the FIG. 1 embodiment of the hydrophone can vary with depth, as pointed out above, and thus in some applications this is not a desirable feature. Liquids on the other hand have a relatively constant although rather low compressibility. At atmospheric pressure, air is about 4000 times more compressible than water. So merely replacing the air or gas in cavity 12 in the FIG. 1 embodiment with a liquid will result in a very insensitive device.

FIG. 2 illustrates an embodiment of the Fabry-Perot fiber optic hydrophone which utilizes a liquid not air or gas, and thus overcomes the problems associated with sensitivity as the result on increased pressure due to increased depth of the hydrophone in a body of water.

Referring now to FIG. 2, the hydrophone comprises a housing or body 30 having rigid walls sections 31 and 32 and rigid end sections 33 and 34. End section 33 includes an outwardly protruding portion or neck 35 having an opening 35′, across which is secured a flexible membrane 36, thus defining a cavity within neck section 35. A fiber optic 37 extends through a sealed opening 38 in end section 34, extends through body 30 and neck 35 in end section 34, with its inner or cleaved end 39 being located in spaced relation to membrane 36, thereby forming a Fabry-Perot interferometer, indicated at 40, which function as described above with respect to the interferometer 21 of FIG. 1. Membrane 36 is provided with a vent hole or opening 41, similar to opening 16 of FIG. 1. The body or housing 30, including the neck 35 and the area behind the membrane 36 defines a volume 42 filled with a liquid, such as water, silicone oil, and hydrocarbon oil, or with a gaseous medium, or mixture having very low compressibility. A bladder 43, similar to bladder 13 of FIG. 1, is secured to end 33 of housing or body 30, and is necessary to prevent loss in fluid volume due to large hydrostatic pressure. As in the FIG. 1 embodiment, the opposite end of fiber 37 is connected to a light source/detector assembly. The volume 42 contains several cm$^3$ of liquid and the area of membrane 36 is small, which allows a larger membrane deflection for a given external acoustic pressure. Also, while not shown a mechanical stop may be secured to neck 35 to limit inward motion of membrane 36 to prevent damage due to over-pressure.

By way of example, the housing or body 30 is constructed of fused silicon or other low expansion ceramic or metal having a wall thickness of 1-3 mm, width of 1-2 cm and height of 1-2 cm, but may be constructed of any material compatible with the fluid in volume 42 and the external medium in which the hydrophone is to be used. The cross-section of opening 35' is 0.1-1.0 mm diameter. The membrane 36 is constructed of plastic having a thickness of 0.1-2.0 $\mu$m and an exposed area of 0.1 to 1.0 mm diameter, with vent hole 41 having a cross-section of 10-50 $\mu$m. The fluid in volume 42 is 0.5-5 cm$^3$ composed of silicone oil. The membrane 36 may be constructed of suitable flexible materials, such as exemplified above in the FIG. 1 embodiment. In addition, the membrane may be constructed of silicon, silicon nitride, or silicon dioxide.

Acoustic waves in water impinge on bladder 43 of FIG. 2 which results in deflection or inward movement of the membrane 36 which modulates the spacing of the Fabry-Perot cavity of interferometer 40, and according the reflected light signal through fiber 37 is amplitude modulated by the incident acoustic wave, producing an appropriate output signal.

It has thus been shown that the present invention provides a miniature Fabry-Perot fiber optic hydrophone having a sensitivity comparable to larger hydrophones, and which can be designed for various depths or other use criteria.

While specific embodiments have been illustrated and described, and specific parameters, materials, etc. have been described, such is not intended to limit the invention to that described and/or illustrated. Modifications and chances will become apparent to those skilled in the art. The scope of the invention is intended to include all such modifications and changes, and is to be limited only by the scope of the appended claims.

We claim:

1. A Fabry-Perot fiber optic hydrophone, comprising:
   a housing having a protruding end section;
   a flexible membrane secured across said protruding end section and defining a cavity;
   an optical fiber extending into said housing and having one end located in said cavity and in spaced relation to said flexible membrane to define an interferometer;
   means for directing light through said optical fiber into said cavity and receiving a reflected signal from said cavity;
   whereby inward movement of said flexible membrane caused by an external force produces a change in reflectivity in said interferometer and the reflected light signal is amplitude modulated by the incident force on the flexible membrane.

2. The hydrophone of claim 1, additionally including a flexible bladder secured to said housing and extending over said flexible membrane, said bladder defining a volume therein containing a fluid.

3. The hydrophone of claim 2, wherein said protruding end section of said housing protrudes inwardly into said housing, and wherein said fluid is selected from the group of air and gas.

4. The hydrophone of claim 3, wherein said gas is selected from the group consisting of SF$_6$, C$_3$H$_8$, and fluorocarbons.

5. The hydrophone of claim 3, wherein said flexible membrane includes a vent hole to provide pressure equalization between said volume in said bladder and said cavity.

6. The hydrophone of claim 5, wherein said flexible membrane is constructed of material selected from the group consisting of plastic, silicon, silicon nitride and silicon dioxide.

7. The hydrophone of claim 6, wherein said flexible bladder is constructed of material selected from the group of rubber and plastic.

8. The hydrophone of claim 7, wherein said bladder is constructed of latex rubber having a thickness in the range of 0.05 mm to 0.5 mm.

9. The hydrophone of claim 7, wherein said bladder is constructed of polyvinylidene chloride.

10. The hydrophone of claim 1, wherein said optical fiber is of the single mode type.

11. The hydrophone of claim 3, wherein said housing and said protruding end section of said housing each include an opening through which said optical fiber extends, said opening being provided with seal means to prevent leakage of fluid there through.

12. The hydrophone of claim 1, wherein said protruding end section protrudes outwardly, and wherein said housing and protruding end section are filled with a fluid.

13. The hydrophone of claim 12, wherein said fluid is a liquid.

14. The hydrophone of claim 12, wherein said housing and protruding end section are constructed of substantially ridge material.

15. The hydrophone of claim 12, wherein said housing is provided with an opening through which said optical fiber extends, and seal means for preventing leakage of fluid through said opening.

16. The hydrophone of claim 12, wherein said flexible membrane is constructed of material selected from the group consisting of plastic, silicon, silicon nitride and silicon dioxide.

17. A fiber optic hydrophone utilizing a Fabry-Perot interferometer, comprising:
   a housing having a wall section and end sections;
   one of said end sections of said housing being provided with a protruding section;
   a flexible membrane secured across said protruding section of said one end section of said housing defining a cavity in said protruding section;
   a single mode optical fiber extending through an opening in at least another of said end sections of said housing and into said cavity, one end of said optical fiber being located in spaced relation to said flexible membrane, and an opposite end of said optical fiber being adapted to be operatively connected to a high source/light signal detection assembly; and sealing means in said opening and around said optical fiber to prevent leakage thereby.

18. The hydrophone of claim 17, wherein said protruding section of said one end section protrudes outwardly from said end section, and wherein at least said housing is filled with a liquid.

19. The hydrophone of claim 17, additionally including a flexible bladder secured to said one end section of said housing and filled with a fluid.

20. The hydrophone of claim 19, wherein said protruding section of said one end section protrudes inwardly into said housing, wherein said protruding section is closed at an end opposite said flexible membrane and is provided with an opening through which said optical fiber extends, seal means in said opening around said optical fiber, wherein said flexible membrane includes a vent hole, and wherein said flexible bladder and said cavity are filled with a fluid selected from air and gas.

21. The hydrophone of claim 17, wherein the flexible membrane and/or an inner end of the optical fiber is coated with reflective material to enhance reflectivity.

22. The hydrophone of claim 1, wherein either or both of the membrane and inner end of the optical fiber is coated with reflective material to enhance reflectivity.

* * * * *